United States Patent [19]
Heidelberger

[11] Patent Number: 5,839,764
[45] Date of Patent: Nov. 24, 1998

[54] AIR LINE CONNECTOR

[75] Inventor: Richard A. Heidelberger, Wheatfield, N.Y.

[73] Assignee: Dynabrade, Inc., Clarence, N.Y.

[21] Appl. No.: 779,898

[22] Filed: Jan. 7, 1997

[51] Int. Cl.[6] ................................... F16L 27/02
[52] U.S. Cl. ..................... 285/276; 285/190; 285/273
[58] Field of Search .................... 285/276, 190, 285/273, 147.1; D23/263

[56] References Cited

U.S. PATENT DOCUMENTS

| 2,088,321 | 7/1937 | Follet ........................................ 285/276 |
| 3,166,252 | 1/1965 | O'Brien et al. ...................... 285/190 X |
| 5,052,432 | 10/1991 | Vonalt et al. ......................... 285/190 X |
| 5,372,389 | 12/1994 | Tam et al. ............................ 285/190 X |
| 5,636,877 | 6/1997 | Purvis et al. ......................... 285/190 X |

OTHER PUBLICATIONS

Dynabrade Sales Literature—Dynaswivel Air Line Connector, Feb. 1989.

*Primary Examiner*—Eric K. Nicholson
*Assistant Examiner*—Greg Binda
*Attorney, Agent, or Firm*—Bean, Kauffman & Snyder

[57] ABSTRACT

An air line connector includes a hose block having first and second passageways disposed in flow communication; a connector block having third and fourth passageways disposed in flow communication; a pivot member having opposite ends rotatably received within the second and third for pivotally connecting the hose and connector blocks; a connector member having one end rotatably received within the fourth passageway; first and second attaching arrangements for connecting the ends of the pivot member to the hose and connector blocks to prevent separating movement of such blocks axially of the pivot member; and a third attaching arrangement for connecting the connector member to the connector block. The first attaching arrangement may include a locking pin supported by the hose block for engagement with the pivot member. The second and third attaching arrangements may include a pair of locking pins carried by the connector block for engagement with the pivot and connector members, respectively, or alternatively a common pivot pin arranged for engagement with both of the pivot and connector members.

23 Claims, 4 Drawing Sheets

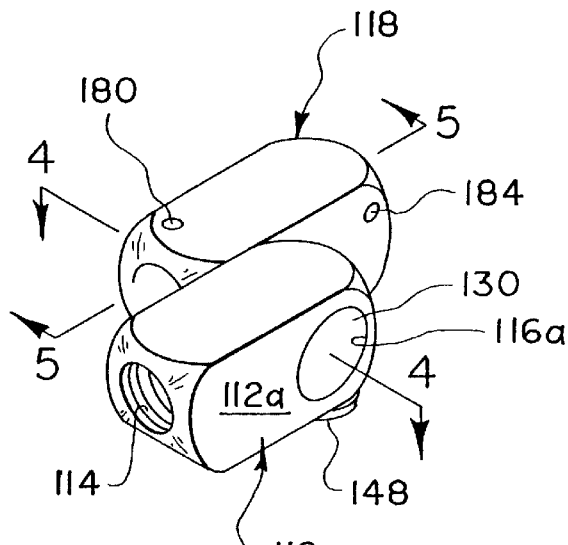
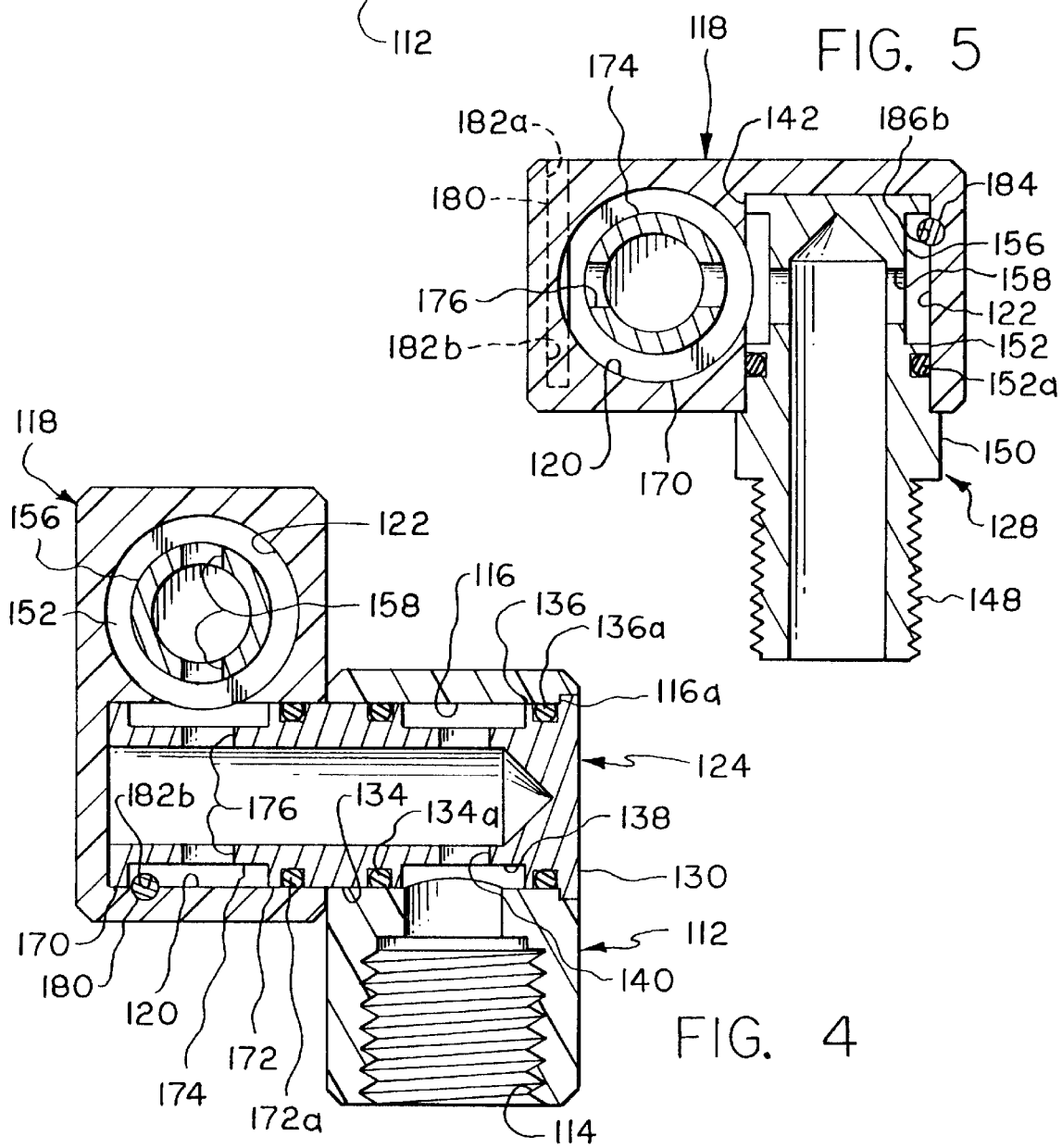
FIG. 3
FIG. 5
FIG. 4

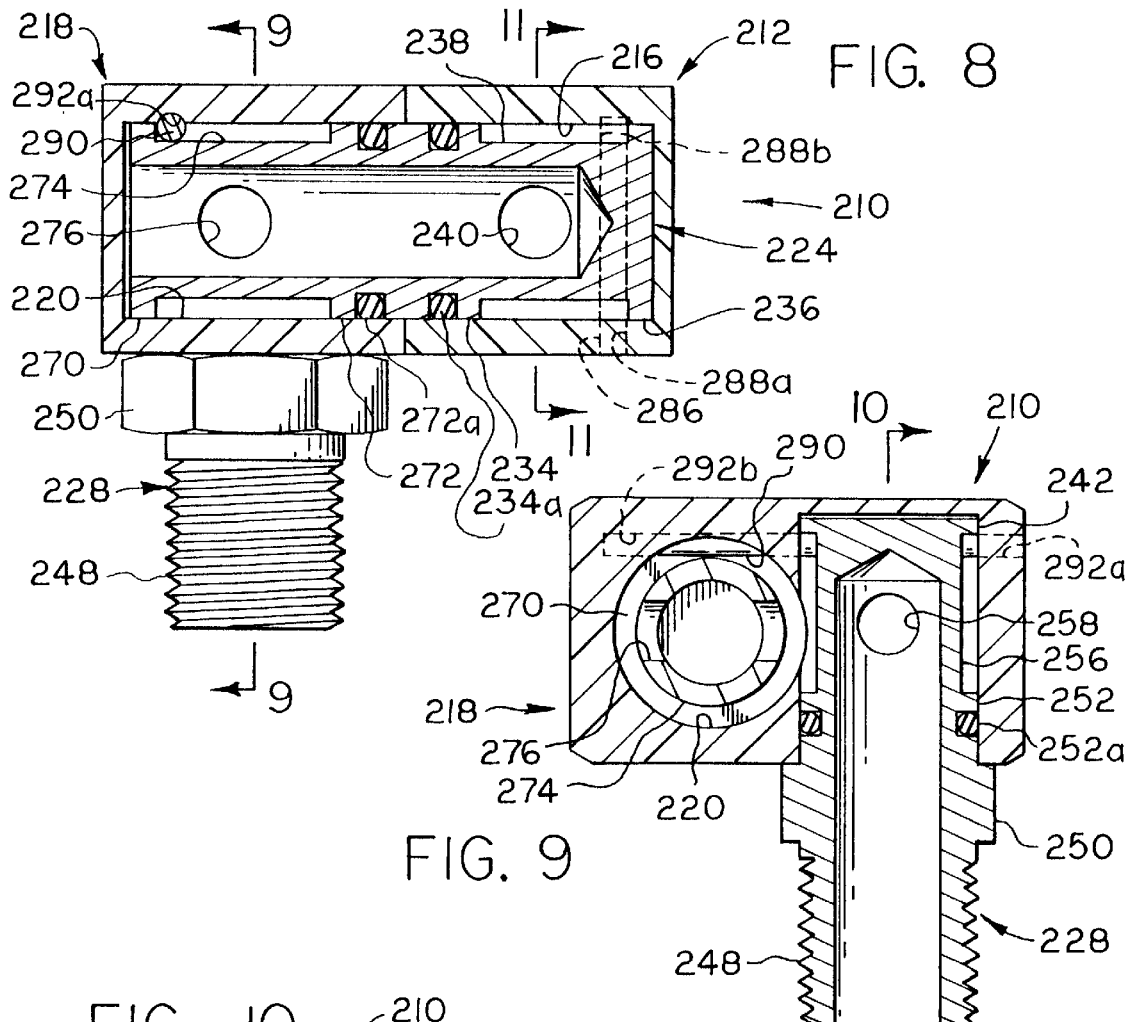
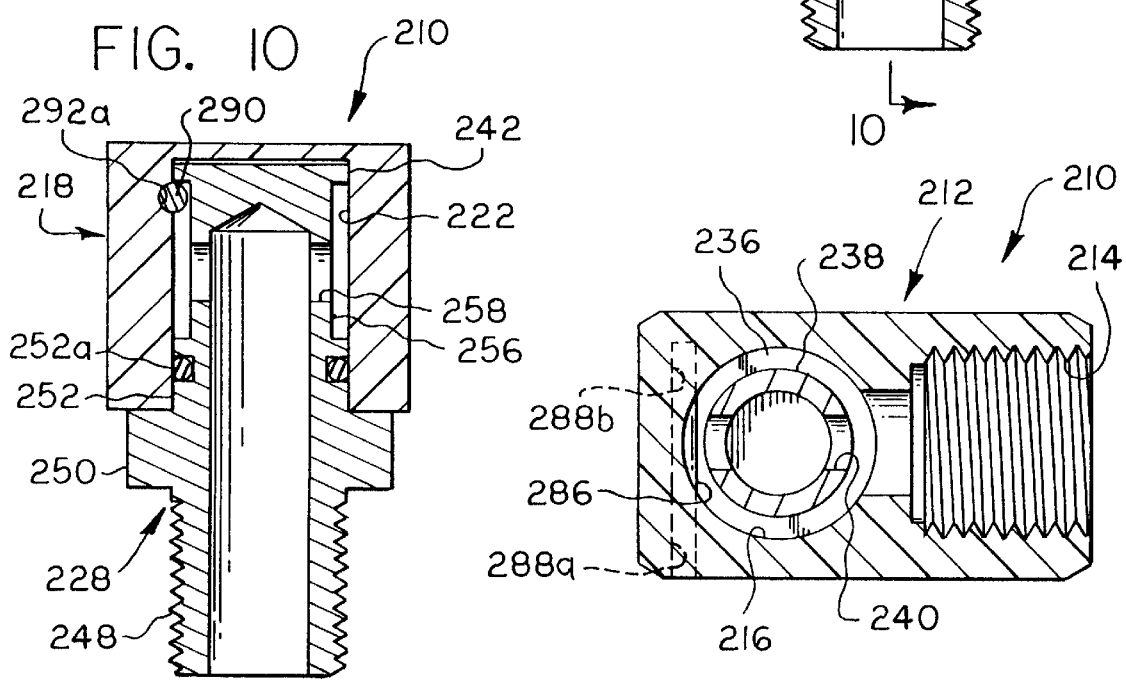

5,839,764

AIR LINE CONNECTOR

BACKGROUND OF THE INVENTION

Air line connectors of the swivel variety adapted for coupling an air operated device to a source of pressurized air are well known. Typically, these swivels include a hose block having a threaded opening for coupling the hose block to a source of pressurized air via a flexible air hose; a connector block; a pivot member for pivotally coupling the hose and connector blocks; and a connector member for threadably coupling the connector block to an air operated device.

In a commercially available air line connector manufactured for a number of years by the assignee of the present invention, the connection between the pivot member and the connector block was defined by screw threads coated with LOCKTITE with a view towards preventing the threads from loosening during use. This connector was also fabricated in a manner allowing a user to disassemble the connector for maintenance purposes.

SUMMARY OF THE INVENTION

The present invention is directed towards improved air line connectors of the swivel variety, which cannot be readily disassembled by a user, whereby to prevent unauthorized repairs, which might result in rendering the connector subject to failure during use.

The air line connector of the present invention further has the advantage of defining fewer flow paths along which air may escape from the connector upon the wearing of fluid seals provided to normally seal such flow paths against leakage.

BRIEF DESCRIPTION OF THE DRAWINGS

The nature and mode of operation of the present invention will now be more fully described in the following detailed description taken with the accompanying drawings wherein:

FIG. 3 is a view showing the air line connector of FIG. 2 in assembled condition;

FIG. 4 is a sectional view taken generally along line 4—4 in FIG. 3;

FIG. 5 is a sectional view taken generally along line 5—5 in FIG. 3;

FIG. 8 is a sectional view taken generally along the line 8—8 in FIG. 7;

FIG. 9 is a sectional view taken generally along the line 9—9 in FIG. 8;

FIG. 10 is a sectional view taken generally along the line 10—10 in FIG. 9; and

FIG. 11 is a sectional view taken generally along the line 11—11 in FIG. 8.

DETAILED DESCRIPTION

Figure 1:
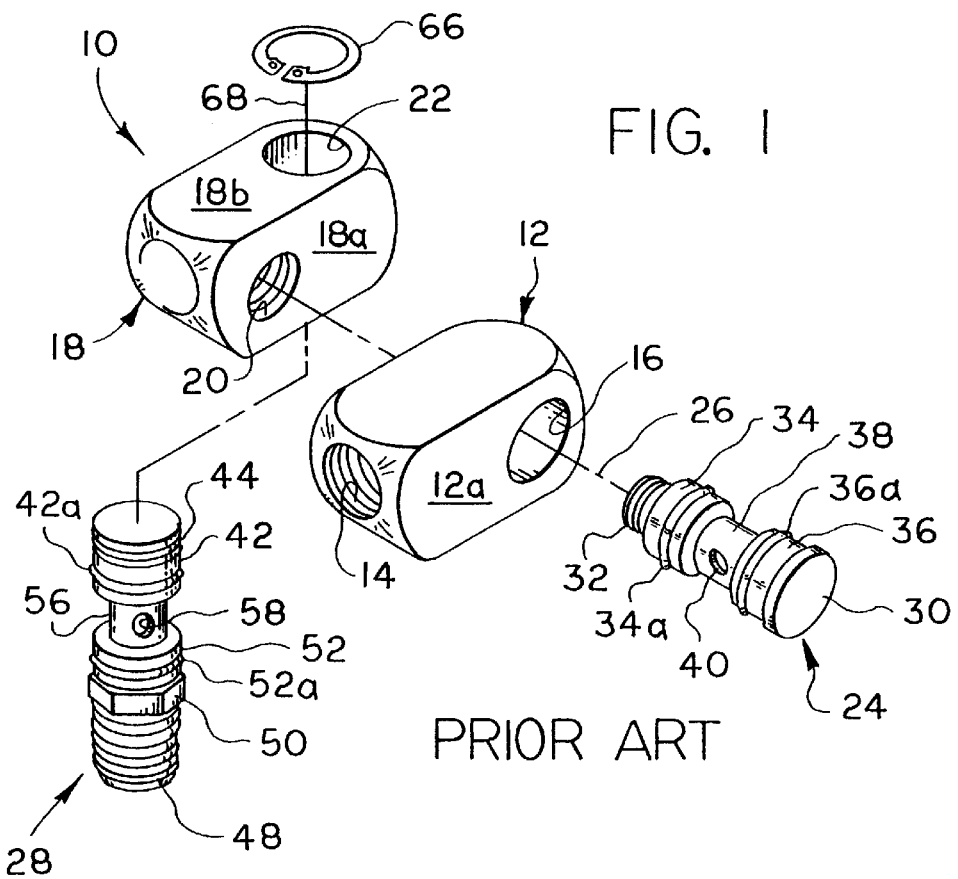
FIG. 1 is an exploded view of an air line connector of the prior art over which the present invention is an improvement.
Figure 2:
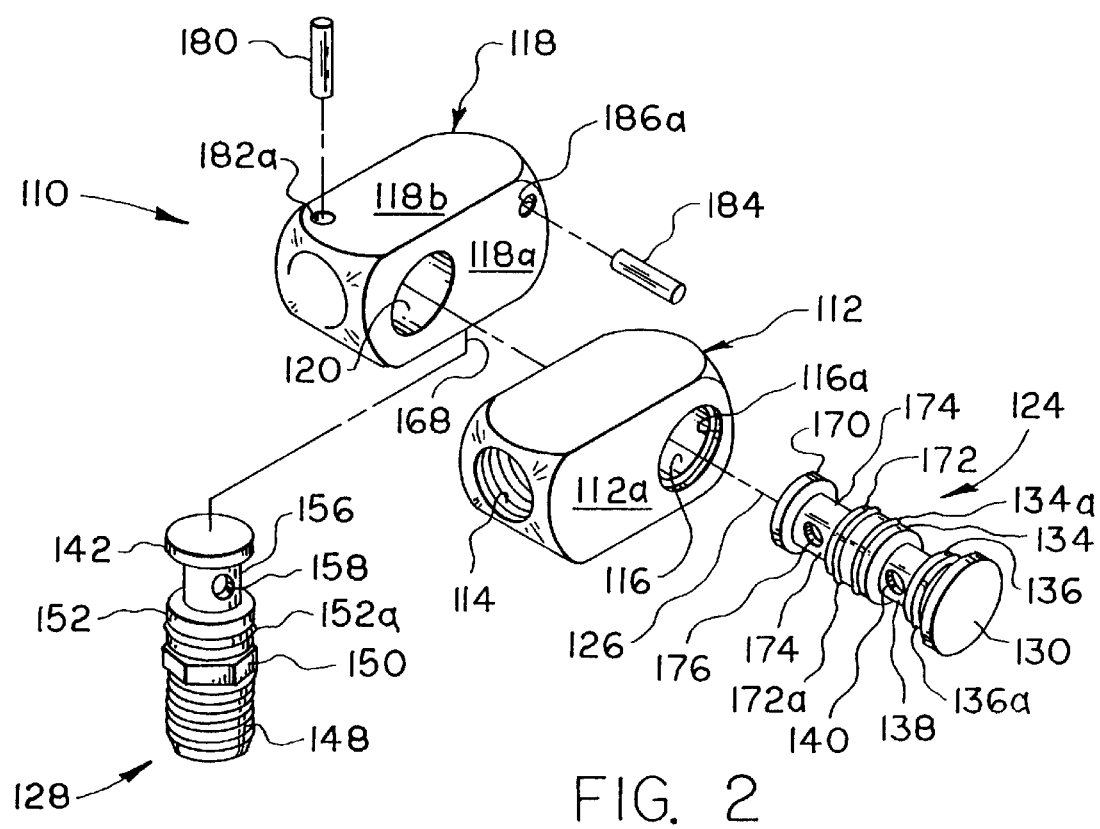
FIG. 2 is an exploded view similar to FIG. 1, but showing an air line connector of the present invention.
Figure 6:
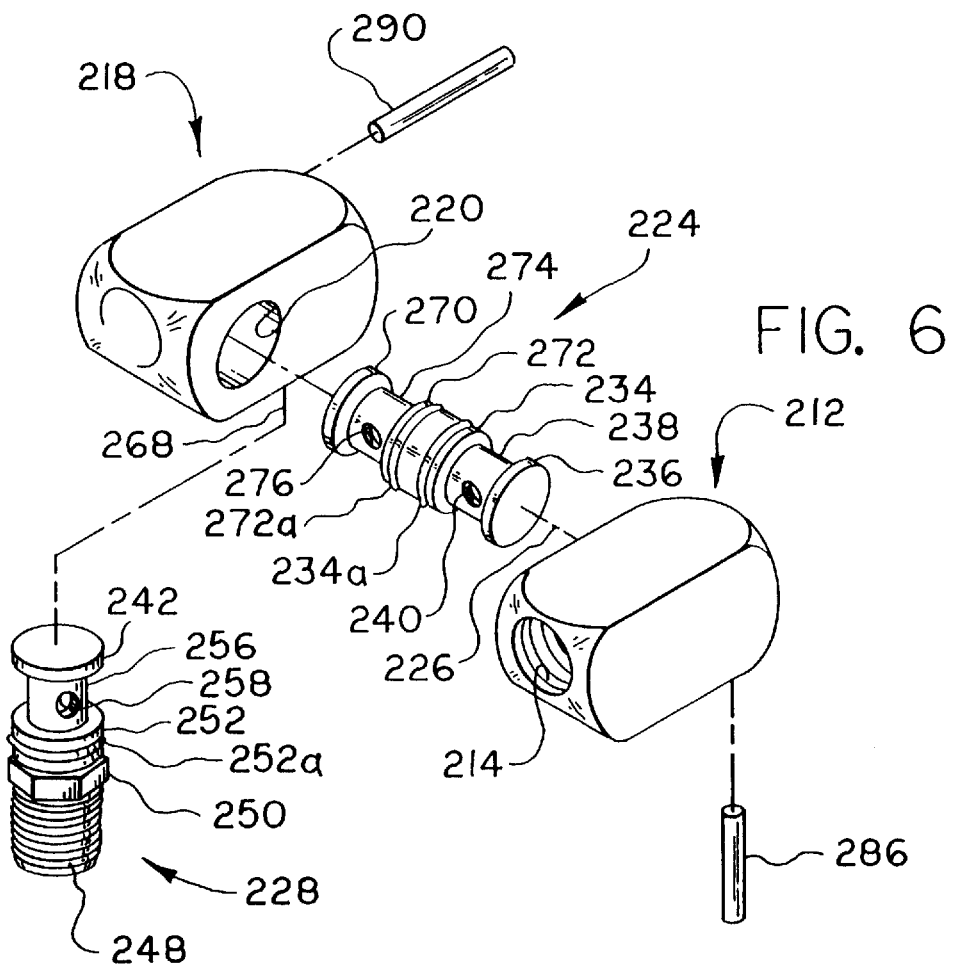
FIG. 6 is an exploded view similar to FIG. 1, but showing a further form of an air line connector of the present invention.
Figure 7:
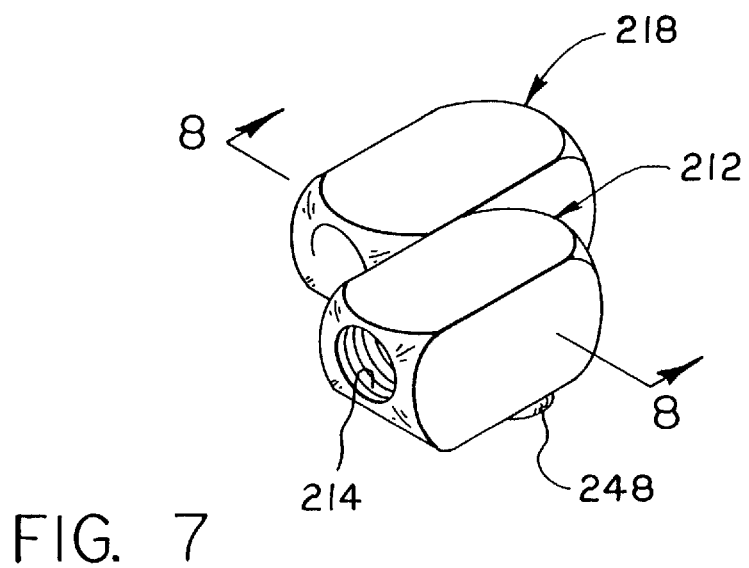
FIG. 7 is a view showing the air line connector of FIG. 6 in assembled condition.

Reference is first made to FIG. 1 wherein a prior commercially available air line connector is generally designated as 10 and shown as including a hose block 12 formed with a one way opening or blind, screw threaded first or inlet passageway 14 adapted to couple the air line connector to a suitable source of pressurized air, not shown, via a suitable air hose, also not shown, and a through opening smooth bore, second passageway 16 disposed in flow communication with an inner end of first passageway 14 and extending transversely relative thereto; a connector block 18 formed with a one way opening or blind, screw threaded third passageway 20 and a through opening, smooth bore fourth passageway 22 disposed in flow communication with an inner end of third passageway 20 and extending transversely relative thereto; a pivot member 24 adapted to pivotally couple the hose block to the connector block for relative movement about a pivot axis 26 extending lengthwise of passageways 16 and 20; and a connector member 28 adapted to couple connector 10 to a suitable air operated device, not shown.

Pivot member 24 has a first end defined by an enlarged head 30, a second end defined by a screw threaded section 32, a pair of parallel annular bearing portions 34 and 36, which bound an annular recess 38 and mount O-ring seals 34a and 36a, and an air flow passageway having a transversely extending through inlet openings 40 disposed intermediate bearing portions 34 and 36 for communication with passageways 14 and 16, and an axially extending discharge opening, not shown, which extends axially through screw threaded section 32.

Connector member 28 includes a first end defined by an annular bearing portion 42 having an annular retaining slot 44 and mounting an O-ring seal 42a; second end defined by a threaded mounting section 48, a hexagonal driving head 50 and an annular bearing portion 52 mounting an O-ring seal 52a; an annular recess 56 bounded by bearing portions 42 and 52; and an air flow passageway having a transversely extending through inlet openings 58 disposed intermediate bearing portions 42 and 52 for communication with passageways 20 and 22, and an axially extending discharge opening, not shown, which extends axially through threaded section 48.

Air line connector 10 is assembled by inserting pivot member 24 through second passageway 16 until its enlarged head 30 abuts against side surface 12a of hose block 12 and then threading screw threaded section 32 into third passageway 20 until hose block 12 is positioned adjacent surface 18a of connector block 18. A suitable adhesive, such as LOCTITE, is applied to screw threaded section 32 in order to prevent loosening of the pivot screw 24 during use. After insertion of pivot member 24, its head 30 cooperates with the female threads of third passageway 20 to define first and second attaching means for attaching the first and second ends of the pivot member to the hose and connector blocks, respectively, for preventing separating movement thereof in a direction aligned with pivot axis 26; and bearing portions 34 and 36 rotatably engage with second passageway 16 to support hose block 12 for pivotal movement relative to connector block with inlet openings 40 disposed in flow communication with first passageway 14 and its associated discharge opening, disposed in flow communication with the inner end of third passageway 20 and thus fourth passageway 22.

Assembly of air line connector 10 is completed by inserting connector member 28 into fourth passageway 22 sufficiently to position annular retaining slot 44 outwardly of connector block surface 18b, whereafter a C-shaped snap ring 66 is inserted into such slot. Thereafter, ring 66 engages with surface 18b and driving head 50 engages with a surface, not shown, of connector block 18 disposed parallel to surface 18*b*, to define a third means for attaching connector member 28 to connector block 18. When connector member 28 is thus inserted, bearing portions 42 and 52 engage within fourth passageway 22 for supporting the connector member for rotation relative to connector block 18 about a second pivot axis 68 extending axially of the fourth passageway.

In accordance with a first form of the present invention, the air line connector of FIG. 1 is modified to provide an improved air line connector designated as 110 in FIGS. 2–5, wherein elements thereof similar to those of air line connector 10 are designated by like 100 series numerals. Thus, air line connector 110 generally includes a hose block 112 having flow connected first and second passageways 114 and 116; a connector block 118 having flow connected third and fourth passageways 120 and 122; a pivot member 124; and a connector member 128. As with the prior construction, hose and connector blocks are mounted for relative swinging or pivotal movement about pivot axis 126, and connector member 128 is supported for rotation relative to the connector block about second pivot axis 168.

The construction of air line connector 110 differs from connector 10 primarily in regard to the construction of pivot member 124 and connector member 128, and the nature of the second and third attachment means employed for attaching the pivot and connector members to connector block 118. Specifically, pivot member 124 differs from pivot member 24 in that screw threaded section 32 of the latter is replaced by a second pair of parallel annular bearing portions 170 and 172, which bound an annular recess 174 formed with a through discharge opening 176 arranged in flow communication with inlet opening 140. Bearing portion 172 serves to mount an O-ring seal 172*a* and is formed as an extension of bearing portion 134.

Connector member 128 differs from connector member 28 in that annular bearing portion 142 has a reduced axial dimension relative to bearing portion 42 and lacks a retaining slot corresponding to retaining slot 44 and a groove for supporting a sealing ring corresponding to o-ring seal 42*a*.

Further, third passageway 120 is now in the form of a one way opening or blind, smooth bore opening sized to rotatably receive a second pair of annular bearing portions 170 and 172; and fourth passageway 122 is now in the form of a one way opening or blind, smooth bore opening sized to rotatably receive annular bearing portion 142 and 152.

In the construction of the second attaching means shown in FIGS. 2–5, a first elongated locking pin 180 having opposite ends thereof supported within a first pair of mounting openings 182*a* and 182*b* of connector block 118 and an intermediate portion received within annular recess 174 for abutting engagement with bearing portion 170 thereby to retain pivot member 124 within third passageway 120. As before, first attaching means may be defined by engagement of head 130 with side surface 112*a* of hose block 112 or preferably by the seating of head 130 within a bore enlargement 116*a* of second passageway 116 to lie flush with side surface 112*a*.

Further, in the construction of third attaching means includes a second elongated locking pin 184 having opposite ends thereof supported within a second pair of mounting openings 186*a* and 186*b* of connector block 118 and an intermediate portion received within annular recess 156 for abutting engagement with bearing portion 142 to retain connector member 128 within fourth passageway 122. Preferably, mounting openings 182*b* and 186*b* are blind bore openings and locking pins 180 and 184 are force-fit into their associated mounting openings in order to prevent removal of such locking pins for connector disassembly purposes without destruction of such locking pins. The surfaces of connector block 118 through which mounting openings 182*a* and 186*a* extend is a matter of choice with these mounting openings being shown in FIG. 2 as extending through surfaces 118*b* and 118*a* only for purposes of clarity. Elements 134*a*, 136, 136*a*, 138, 148, 150, 152*a* and 158 of an air line connector 110 correspond to previously described elements 34*a*, 36, 36*a*, 38, 48, 50, 52*a* and 56 of an air line connector.

It is preferable to form hose block 112 and connector block 118 of a composite plastic material in order to reduce marring of surfaces with which connection 110 may come in contact.

In accordance with a second or alternative form of the present invention, the air line connector of FIG. 1 is modified to provide an air line connection designated as 210 in FIGS. 6–11, wherein elements thereof similar to those of air line connector 10 are designated by like 200 series numerals. Thus, air line connector 210 generally includes a hose block 212 having flow connected first and second passageways 214 and 216; a connector block 218 having flow connected third and fourth passageways 220 and 222; a pivot member 224; and a connector member 228. The hose and connector blocks are mounted for relative swinging or pivotal movement about a pivot axis 226, and connector member 228 is supported for rotation relative to the connector block about second pivot axis 268.

The construction of air line connector 210 differs from that of connector 10 in regard to the construction of pivot member 224 and connector member 228, and the nature of the first, second and third attachment means. Specifically, pivot member 224 differs from pivot member 24 in that screw threaded section 32 of the latter is replaced by a second pair of parallel annular bearing portions 270 and 272, which bound an annular recess 274 formed with a through discharge opening 276 arranged in flow communication with inlet opening 240. Bearing portions 272 serve to mount an O-ring seal 272*a* and forms an extension of bearing portion 234. Further, head 30 and O-ring seal 36*a* of connector 10 are dispensed with.

Connector member 228 differs from connector member 28 in that annular bearing portion 242 has a reduced axial dimension relative to bearing portion 42 and lacks a retaining slot corresponding to retaining slot 44 and a groove for supporting a sealing ring corresponding to sealing ring 42*a*.

Further, second, third and fourth passageways 216, 220 and 222 are now formed as one way opening smooth bore passageways, wherein passageway 216 is sized to rotatably receive bearing portions 234 and 236, passageway 220 is sized to rotatably receive bearing portions and passageway 222 is sized to rotatably receive bearing portions 242 and 252.

In the construction of the first attaching means shown in FIGS. 6–11, an elongated locking pin 286 having opposite ends thereof supported within a pair of mounting openings 288*a* and 288*b* of hose block 212 and an intermediate portion received within annular recess 238 for abutting engagement with bearing portion 236 thereby to retain pivot member 224 within second passageway 216. Further in this construction, second and third attaching means are defined by a common locking pin 290 having opposite ends thereof supported within a pair of mounting openings 292*a* and 292*b* of connector block 218 and an intermediate portion received within annular recesses 274 and 256 for abutting engagement with bearing portions 270 and 242, respectively. Preferably, locking pins 286 and 290 are force-fit into their associated mounting openings to prevent removal without destruction thereof, so as to provide a visual indication whenever unauthorized disassembly of connector 210 has been attempted. Also, it is preferable to form hose block 212 and connector block 218 of plastic material in order to prevent marring of surfaces contacted by connector 210 during use.

The air line connectors 110 and 210 each have the advantage over prior art connector 10 in that they cannot normally be disassembled once their associated locking pins are forced into place, thus avoiding the possibility of undetected maintenance on these connectors being performed by a user. Further, connectors 110 and 210 have the advantage of defining one or two less potential escape paths through which air might escape from these connectors during use, due to forming fourth passageways 122 and 222 and second passageway 216 as one way opening or blind passageways.

Connector 210 is preferred from the standpoint it reduces to two the number of potential air leakage paths for the connector, but has the disadvantage that its weight/overall size is slightly greater than connector 110, due to the necessity of making connector block 218 slightly wider than connector block 118 in order to permit receipt of locking pin 290 within both of recesses 256 and 274. Elements 234a, 248, 250, 252a and 258 of air line connector 210 correspond to previously described elements 34a, 48, 50, 52a and 58 of air line connector 10.

While two forms of air line connectors have been described, it will be apparent that structural features of such forms may be combined in other ways, if desired, to define other forms of air line connectors. As by way of example, it is contemplated that the first attaching means of connectors 110 and 210 may be interchanged with a view towards reducing the number of required locking pins to one, although to do so will increase the number of potential air escape paths.

What is claimed is:

1. In an air line connection including a hose block having a first passageway for connection to a source of air under pressure, and a second passageway disposed in flow communication with said first passageway; a connector block having a third passageway adapted for alignment with said second passageway and a fourth passageway disposed in flow communication with said third passageway; pivot means having first and second ends received within said second and third passageways, respectively, for connecting said hose and connector blocks for pivotal movement about an axis aligned with said second and third passageways; first and second attaching means for attaching said first and second ends of said pivot means to said hose and connector blocks, respectively, for preventing separating movement of said hose and connector blocks in a direction aligned with said axis; a connector means received within said fourth passageway for connection to an air operated device; and third attaching means for attaching said connector means to said connector block; the improvement comprising in combination:

said second attaching means includes a first locking pin supported by said connector block and engaging with said pivot means for retaining said pivot means within said third passageway, said pivot means has an annular groove disposed in said third passageway, said first locking pin has opposite ends and an intermediate portion, said connector block has a first pair of mounting openings connected into said third passageway, said opposite ends of said first locking pin are supported by said connector block within said first pair of mounting openings, and said intermediate portion of said first locking pin engages said pivot means within said annular groove thereof; and said third attaching means includes a second locking pin supported by said connector block and engaging with said connector means for retaining said connector means within said fourth passageway, said connector means has an annular groove disposed within said fourth passageway, said second locking pin has opposite ends and an intermediate portion, said connector block has a second pair of mounting openings connected into said fourth passageway, said opposite ends of said second locking pin are supported by said connector block within said second pair of mounting openings, and said intermediate portion of said second locking pin engages said connector means within said annular groove thereof.

2. The improvement according to claim 1, wherein said third and fourth passageways are one way opening bore passageways.

3. In an air line connection including a hose block having a first passageway for connection to a source of air under pressure and a second passageway disposed in flow communication with said first passageway; a connector block having a third passageway adapted for alignment with said second passageway and fourth passageway disposed in flow communication with said third passageway; pivot means having first and second ends received within said second and third passageways, respectively, for connecting said hose and connector blocks for pivotal movement about an axis aligned with said second and third passageways; first and second attaching means for attaching said first and second ends of said pivot means to said hose and connector blocks, respectively, for preventing separating movement of said hose and connector blocks in a direction aligned with said axis; a connector means received within said fourth passageway for connection to an air operated device; and third attaching means for attaching said connector means to said connector block; the improvement comprising in combination:

said second and third attaching means includes a common locking pin supported by said connector block and having portions engaging with said pivot means and said connector means for retaining said pivot means and said connector means within said third and fourth passageways.

4. The improvement according to claim 3, wherein said first attaching means includes another locking pin supported by said hose block and having a portion engaging with said pivot means for retaining said pivot means within said second passageway.

5. The improvement according to claim 3, wherein said third and fourth passageways are one way opening bore passageways.

6. The improvement according to claim 5, wherein said second passageway is a one way opening bore passageway; and wherein said first attaching means includes another locking pin supported by said hose block and having a portion engaging with said pivot means for retaining said pivot means within said second passageway.

7. The improvement according to claim 3, wherein said pivot means and said connector means define annular grooves, said connector block defines a pair of mounting openings, said common locking pin has opposite ends supported by said connector block within said pair of mounting openings and an intermediate portion received within said annular grooves.

8. The improvement according to claim 7, wherein said third and fourth passageways are one way opening bore passageways.

9. The improvement according to claim 8, wherein one of said mounting openings is a blind bore opening.

10. The improvement according to claim 7, wherein said first attaching means includes another locking pin supported by said hose block for retaining said pivot means within said second passageway, said hose block defines another pair of mounting openings, said pivot means has another annular groove, said other locking pin has opposite ends supported by said hose block within said other pair of mounting openings and an intermediate portion received within said other annular groove, said second passageway is a one way opening bore opening, and one mounting opening of said other pair of mounting openings is a blind bore opening.

11. In an air line connection including a hose block having a first passageway for connection to a source of air under pressure, and a second passageway disposed in flow communication with said first passageway; a connector block having a third passageway adapted for alignment with said second passageway and a fourth passageway disposed in flow communication with said third passageway; pivot means having first and second ends received within said second and third passageways, respectively, for connecting said hose and connector blocks for pivotal movement about an axis aligned with said second and third passageways; first and second attaching means for attaching said first and second ends of said pivot means to said hose and connector blocks, respectively, for preventing separating movement of said hose and connector blocks in a direction aligned with said axis; a connector means received within said fourth passageway for connection to an air operated device; and third attaching means for attaching said connector means to said connector block; the improvement comprising in combination:

said pivot means has an annular groove arranged in flow communication with said third passageway, an air discharge opening disposed in said annular groove, and an air inlet opening communicating with said second passageway and with said air discharge opening;

said connector means has another annular groove arranged in flow communication with said fourth passageway and an air inlet opening disposed in said other annular groove and for communication with said air operated device;

said second attaching means includes a first locking pin supported by said connector block and engaging with said pivot means within said annular groove for retaining said pivot means within said third passageway; and said third attaching means includes a second locking pin supported by said connector block and engaging with said connector means within said other annular groove for retaining said connector means within said fourth passageway.

12. The improvement according to claim 11, wherein said connector block has two pairs of mounting openings, said first locking pin has opposite ends received within one of said pairs of mounting openings, and an intermediate portion received within said annular groove of said pivot means, and said second locking pin has opposite ends received within another of said pairs of mounting openings and an intermediate portion received within said annular groove of said connector means.

13. The improvement according to claim 12, wherein said third and fourth passageways are one way opening bore passageways.

14. The improvement according to claim 13, wherein one mounting opening of each of said pairs of mounting openings is a blind bore opening.

15. In an air line connection including a hose block having a first passageway for connection to a source of air under pressure, and a second passageway disposed in flow communication with said first passageway; a connector block having a third passageway adapted for alignment with said second passageway and a fourth passageway disposed in flow communication with said third passageway; pivot means having first and second ends received within said second and third passageways, respectively, for connecting said hose and connector blocks for pivotal movement about an axis aligned with said second and third passageways; first and second attaching means for attaching said first and second ends of said pivot means to said hose and connector blocks, respectively, for preventing separating movement of said hose and connector blocks in a direction aligned with said axis; a connector means received within said fourth passageway for connection to an air operated device; and third attaching means for attaching said connector means to said connector block; the improvement comprising in combination:

said pivot means has first and second annular grooves arranged in and in flow communication with said second and third passageways, respectively, and air inlet and air discharge openings communicating with each other and disposed in said first and second annular grooves, respectively; and said second attaching means includes a first locking pin supported by said connector block and having a portion engaging with said pivot means within said second annular groove for retaining said pivot means within said third passageway.

16. The improvement according to claim 15, wherein said connector means has an annular groove arranged in and in flow communication with said fourth passageway and an air inlet opening disposed in said annular groove of said connector means and arranged for communication with said air operated device, said third attaching means includes a second locking pin supported by said connector block and engaging within said annular groove of said connector means for retaining said connector means within said fourth passageway.

17. The improvement according to claim 16, wherein said second, third and fourth passageways are one way opening bore passageways.

18. The improvement according to claim 17, wherein said connector block defines two pairs of mounting openings, each of said locking pins having opposite ends received within one of said pairs of mounting openings.

19. The improvement according to claim 15, wherein said first attachment means includes a second locking pin supported by said hose block and engaging within said first groove for retaining said pivot means within said second passageway.

20. The improvement according to claim 19, wherein second and third passageways are one way opening bore passageways.

21. The improvement according to claim 19, wherein said hose block and said connector block each define a pair of mounting openings, said first locking pin has opposite ends received with said mounting openings of said connector block and an intermediate portion received within said second annular groove, and said second locking pin has opposite ends received within said mounting openings of said hose block and an intermediate portion received within said first annular groove.

22. The improvement according to claim 15, wherein said third attaching means includes said first locking pin having an other portion engaging with said connector means for retaining said connector means within said fourth passageway.

23. The improvement according to claim 22, wherein said connector means defines an annular groove arranged in and in flow communication with said fourth passageway and an air inlet opening disposed in said annular groove of said connector means and arranged for communication with said air operated device, said connector block has a pair of mounting openings, said first locking pin has opposite ends received within said mounting openings and an intermediate portion defining said portion engaging with said pivot means and said other portion, and said portion engaging with said pivot means is received within said second annular groove and said other portion is received within said annular groove of said connector means.

* * * * *